United States Patent [19]

Ashton et al.

[11] 4,170,235

[45] Oct. 9, 1979

[54] AXIAL FLOW COMBINE HARVESTER

[75] Inventors: Robert Ashton, Islington; Wilbert D. Weber, Mississauga, both of Canada

[73] Assignee: Massey-Ferguson Industries Limited, Toronto, Canada

[21] Appl. No.: 850,434

[22] Filed: Nov. 10, 1977

[51] Int. Cl.² ............................................. A01F 12/18
[52] U.S. Cl. .................................... 130/27 T; 56/14.6
[58] Field of Search ......................... 56/14.5, 14.6, 15; 198/657, 669, 625, 778, 548; 130/27 T

[56] References Cited

U.S. PATENT DOCUMENTS

| | | | |
|---|---|---|---|
| 2,390,680 | 12/1945 | Ausherman | 198/669 |
| 2,653,701 | 9/1953 | Heth | 198/669 |
| 2,745,409 | 5/1956 | Tillotson | 130/27 T |
| 2,978,097 | 4/1961 | Blanshine | 198/669 X |
| 3,233,395 | 2/1966 | Dahl et al. | 56/14.5 |
| 3,464,419 | 9/1969 | Knapp et al. | 130/27 T |
| 3,537,460 | 11/1970 | Van Buskirk | 130/27 T |

*Primary Examiner*—Russell R. Kinsey
*Attorney, Agent, or Firm*—Robert L. Farris

[57] ABSTRACT

An axial flow combine harvester with a frame and an axial flow threshing and separating rotor rotatably mounted on the frame in a tubular casing. Feed means are provided for feeding crop material from a crop harvesting table to the axial flow threshing and separating rotor. The feed means includes an auger beater with a shaft rotatably journaled on the frame, at least one spiral flight section with a right hand helix attached to the shaft and at least one spiral flight section with a left hand helix attached to the left. The auger beater receives a mat of crop material, moves both edges of the mat toward the center and then feeds the mat to the axial flow threshing and separating rotor.

10 Claims, 3 Drawing Figures

AXIAL FLOW COMBINE HARVESTER

This invention relates to an axial flow combine harvester. More specifically, the invention relates to a crop material feeding apparatus for feeding crop material to an axial flow threshing and separating rotor.

Experimental work has been conducted on axial flow combine harvesters for many years. One of the major problems with this type of harvester has been the feed of crop material to the threshing and separating rotor. Many arrangements have been tried to overcome feeding problems.

One solution has been to feed crop material in tangentially to an axial flow threshing and separating rotor. This solution solves the feeding problem but causes problems with machine arrangement. With tangential feeding, the rotor axis is usually transverse to the direction of travel making the combine wide and short.

Another solution has been to blow crop material to the threshing and separating rotor. The air which is forced into the casing for the axial flow threshing and separating rotor can create problems with the harvester cleaning mechanisms. Blowers require substantial power. Also considerable difficulty can be encountered in feeding crop material into the blower and in preventing the blower from plugging.

An attempt has been made to solve the feeding problem by dropping crop material on top of an axial flow threshing and separating rotor. This solution requires an extremely long elevator from the crop harvesting table or header. The gravity feed from the delivery end of the elevator tends to permit blockages.

The use of conical inlet sections and other funnel shaped inlets of various configurations has also been tried. The basic problem with these inlets is that they often provide an area where crop material is not positively conveyed. Any area without positive conveying mechanisms is subject to a slowdown of crop material flow or plugging. In the conical inlet sections, various types of inlet paddles or vanes have been tried. Some of these paddles have included shear bars and blades for chopping the straw to prevent blockages. Such devices have the obvious disadvantage of expending energy to chop the crop material. The short pieces of straw which are created can result in overloading of the grain cleaning means. They also make it difficult or impossible to gather and use the straw for such things as animal bedding or paper making.

The axial flow combine harvester of this invention includes a frame supported on ground engaging wheels, a tubular casing mounted on the frame, an axial flow threshing and separating rotor rotatably mounted on the frame in the tubular casing, a crop inlet in the tubular casing adjacent one end of the threshing and separating rotor and feed means for feeding crop material through the crop inlet in the tubular casing to the axial flow threshing and separating rotor. The feed means includes an auger beater with a shaft rotatably journaled on the frame adjacent the crop inlet in the tubular casing on an axis of rotation in a plane that is generally perpendicular to the axis of rotation of the rotor. At least one spiral flight section is attached to each end of the shaft. The flight sections move crop material away from the ends of the shaft, through the crop inlet in the tubular casing and to the axial flow threshing and separating rotor.

Paddle members extending outwardly from the center portion of the shaft with at least one end of each paddle attached to one spiral flight section may be provided. The paddle members feed crop material to the axial flow threshing and separating rotor.

Figure 1:
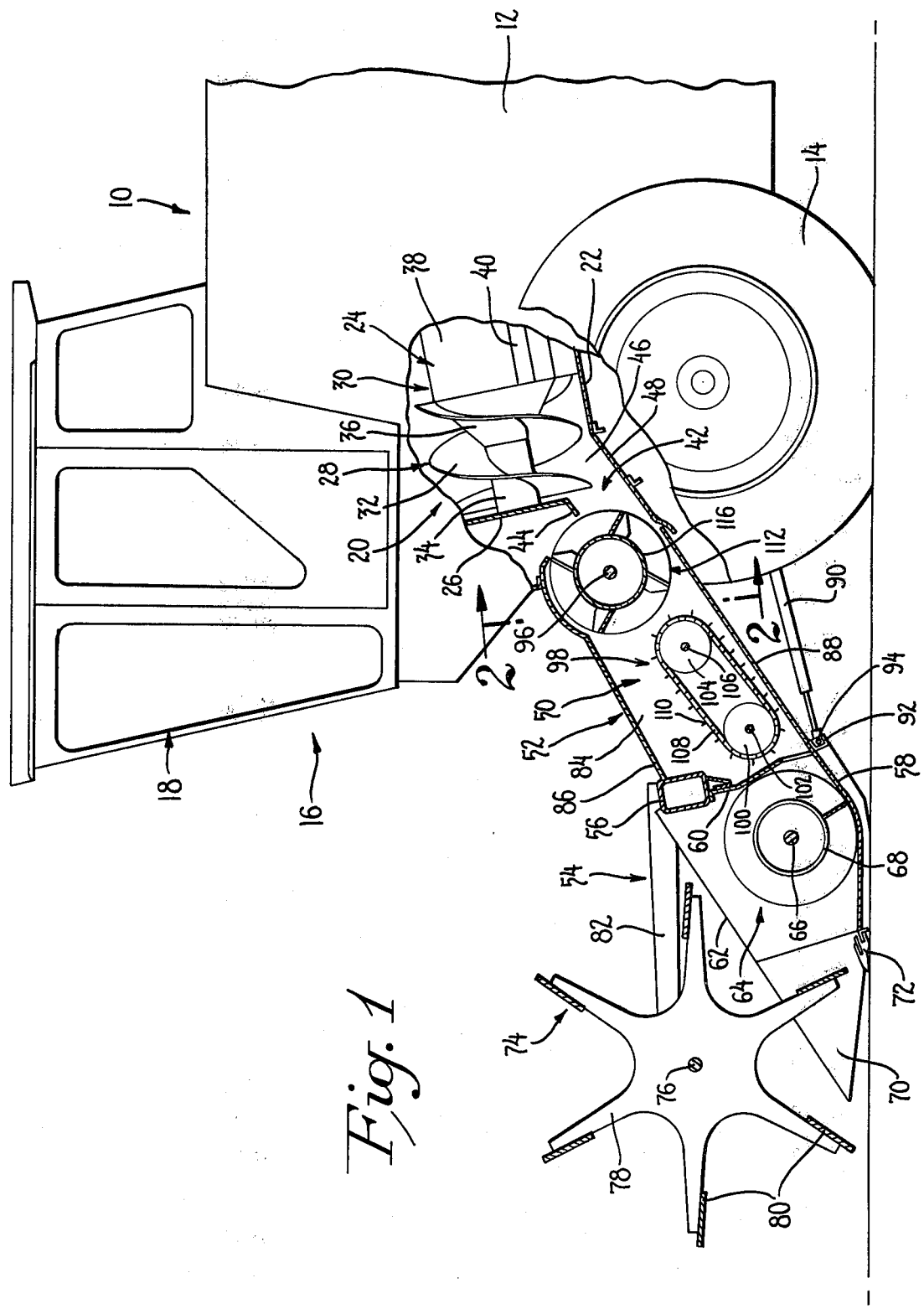
FIG. 1 is a side elevation with parts broken away and shown in section of the forward portion of an axial flow combine harvester with portions broken away to show the front portion of the axial flow threshing and separating rotor and the crop feeder for feeding crop material through the crop inlet and to the axial flow threshing and separating rotor.
Figure 2:
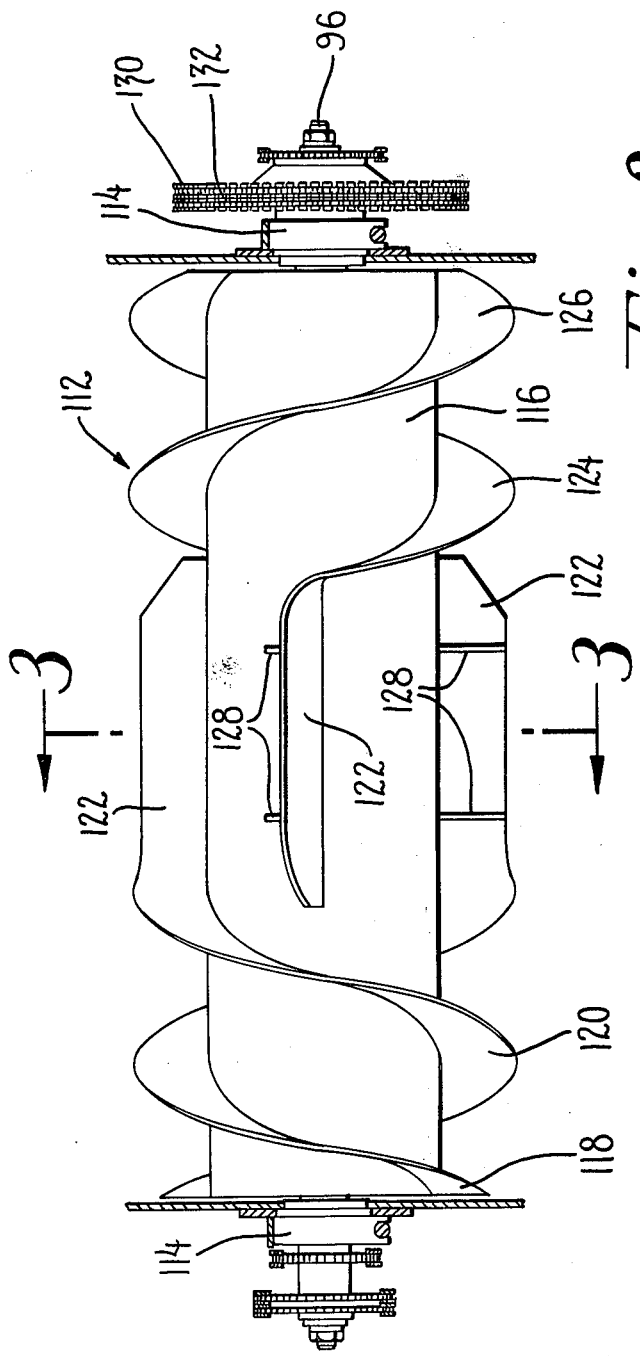
FIG. 2 is an enlarged sectional view of the rear portion of the crop feeder showing an auger beater for feeding crop material taken along line 2—2 of FIG. 1.
Figure 3:
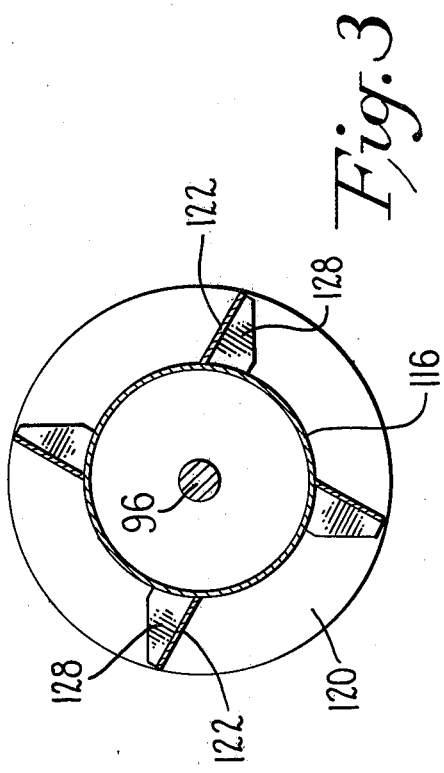
FIG. 3 is a sectional view of the auger beater taken along line 3—3 of FIG. 2.

The axial flow combine harvester 10 as partially shown in FIG. 1 is a self-propelled machine with a combine harvester frame 12 supported by a plurality of wheels 14 only one of which is shown. An operator's station 16 is mounted on the forward portion of the combine harvester frame 12 above the front wheels 14. The operator's station 16 includes an enclosed cab 18 to protect the operator from heat, cold, dirt, wind and noise.

The threshing and separating elements 20 of the axial flow combine harvester 10 include a tubular casing 22 mounted on the combine harvester frame 12. An axial flow threshing and separating rotor 24 is rotatably mounted on the combine harvester frame 12 inside the tubular casing 22. The axial flow threshing and separating rotor 24 rotates about a generally fore and aft axis that extends up and to the rear from the front wall 26 of the tubular casing 22.

The axial flow threshing and separating rotor 24 includes a forward intake section 28, a threshing section 30 and a rear separation section which is not shown. The forward intake section 28 includes auger flighting 32 mounted on a forward drum section 34 and a truncated conical section 36. The threshing section 30 includes a rear drum section 38 attached to the large portion of the truncated conical section 36 of the forward intake section 28 and threshing bar assemblies 40.

The crop inlet 42 into the tubular casing 22 is in the forward bottom portion of the tubular casing. The bottom edge of the front wall 26 with its integral forwardly extending lip 44, the inlet side walls 46 and the inlet floor 48 define the crop inlet 42. The crop inlet 42 directs crop material toward the lower front portion and the forward bottom portion of the forward intake section 28 of the axial flow threshing and separating rotor 24. The maximum width of the crop inlet 42 as defined by the inlet side walls 46 is preferably substantially the same as the diameter of the tubular casing 22.

Crop material is fed through the crop inlet 42 by crop feed mechanisms 50 in the elevator housing 52. The elevator housing 52 receives crop material from the harvesting table 54. The harvesting table 54 could be a corn head with gathering chains and snapping rolls. The harvesting table 54 could also be a row crop table for crops like soybeans.

The harvesting table 54 as shown in FIG. 1 is a standard grain table for crops like wheat, barley and oats. This harvesting table 54 includes a frame member 56, a table bottom 58 and a rear panel 60 connected to the frame member 56 and the table bottom 58. Table end sections 62 are attached to each end of the frame member 56 and the table bottom 58. A table auger 64 is rotatably supported by the two table end sections 62. The table auger 64 includes a shaft section 66 at each end journaled in bearings on the adjacent table end section 62, a tube 68 attached to the shaft sections 66 and extending from one table end section 62 to the other table end section 62 which is not shown. Crop dividers 70 are mounted on the forward portion of the table end sections 62. A knife 72 for severing crop material is mounted on the forward edge of the table bottom 58. A reel 74 including a reel shaft 76, a plurality of reel spiders 78 and a plurality of reel bats 80 is rotatably journaled on a pair of reel support arms 82. A reel support arm 82 is attached to each end of the frame member 56 and the adjacent table end section 62.

The harvesting table 54 is detachably connected to the elevator housing 56. The elevator housing 52 includes a pair of side walls 84, a top wall 86 and an elevator floor 88. The upper rear end of the elevator housing 52 is pivotally attached to the combine harvester frame 12. A hydraulic cylinder 90 has its forward end pivotally attached to a bracket 92 on the elevator floor 88 of the elevator housing by a pin 94. The rear end of the hydraulic cylinder 90 is pivotally attached to the combine harvester frame 12 by a pin which is not shown. Normally, there are two parallel hydraulic cylinders 90 for pivoting the elevator housing 52 about the axis of shaft 96 to raise and lower the harvesting table 54. With heavy tables such as eight row corn harvesting tables, it is common to employ three or more parallel hydraulic cylinders 90 for pivoting the elevator housing 52 about the axis of shaft 96.

The feed members in the elevator housing 52 include a raddle 98. The raddle 98 includes a lower drum 100 rotatably journaled for rotation about the axis of shaft 102 and at least a pair of sprockets 104 rotatable about the axis of shaft 106. At least two chains 108 are trained around the lower drum 100 and the sprockets 104. Slats 110, each of which are attached to at least two chains 108, are provided for conveying crop material.

The shaft 106 is driven in a counterclockwise direction as shown in FIG. 1 so that the slats 110 convey crop material, from the harvesting table 54, along the upper surface of the elevator floor 88. The mat of crop material conveyed by the slats 110 is somewhat wider than the diameter of the tubular casing 22.

An auger beater 112 also within the elevator housing 52, receives crop material from the raddle 98, decreases the width of the mat and conveys it through the crop inlet 42 into the tubular casing 22. The auger beater 112 includes a shaft 96 rotatably journaled on the combine harvester frame 12 by bearings 114. A hollow shaft or tube 116 is attached to the shaft 96 and extends from one side wall 84 to the other side wall 84 of the elevator housing 52. A pair of helical flight sections 118 and 120 each with a right hand helix, are attached to one end of the tube 116. The ends of the helical flight sections 118 and 120, remote from the end of the tube 116, are each attached to one of the paddle members 122. A pair of helical flight sections 124 and 126, each with a left hand helix, are attached to the other end of the tube 116. The ends of the helical flight sections 124 and 126, remote from the end of the tube 116, are each attached to one of the paddle members 122. The paddle members 122, each have one end attached to a helical flight, and are secured to the tube 116. Brace members 128 are attached to the paddle members 122 and the tube 116.

Conventional drive means are provided for driving the various components of the combine. These drives are not shown.

In operation, the harvesting table 54 severs crop material from the ground, gathers the severed crop material, and feeds it into the elevator housing 52. The raddle 98 in the elevator housing 52 receives crop material from the table auger 64 and conveys it along the upper surface of the elevator floor 88. Obviously, the raddle 98 could be replaced by a series of paddle conveyors if desired. The auger beater 112 is driven by a double chain 130 trained around a sprocket 132 on one end of the shaft 96. The helical flights 118, 120, 124 and 126 each engage crop material as it leaves the raddle 98 and convey each edge of the mat of crop material toward the center of the elevator housing 52 and away from the adjacent side wall 84 of the elevator housing 52. The paddle members 122 convey the crop material, which is received from the helical flight sections 118, 120, 124 and 126 and from the raddle 98, under the tube 116 and through the crop inlet 42 in the forward bottom portion of the tubular casing 22. The auger flighting 32, on the forward portion of the axial flow threshing and separating rotor 24, engages the crop material as soon as it enters the tubular casing 22 and conveys it toward the threshing section 30.

We claim:

1. An axial flow combine harvester with a frame, ground engaging wheel means supporting the frame, a tubular casing mounted on the frame, an axial flow threshing and separating rotor rotatably mounted on the frame in the tubular casing, a crop inlet in the lower portion of the tubular casing adjacent one end of the threshing and separating rotor, and feed means capable of feeding crop material through the crop inlet in the tubular casing to the axial flow threshing and separating rotor characterized by an auger beater with shaft means at the ends thereof rotatably journaled on the frame adjacent the crop inlet in the tubular casing on the axis of rotation in a plane that is generally perpendicular to the axis of rotation of the rotor, said beater including at least one spiral flight section with a right hand helix and at least one spiral flight section with a left hand helix and drive means to rotate the auger beater so as to move the crop material centrally and; away from the ends thereof, under the axis of rotation of the auger beater and through the crop inlet in the tubular casing and to the axial flow threshing and separating rotor.

2. The axial flow combine harvester of claim 1 characterized by the auger beater including a hollow tubular member with the spiral flight sections and paddle members attached to the outer surface thereof.

3. The axial flow combine harvester of claim 2 characterized by the auger beater including two spiral flight sections each of which has a right hand helix attached to one end portion of the outer surface of said hollow tubular member, two spiral flight sections each of which has a left hand helix attached to the other end portion of the outer surface of said hollow tubular member and a plurality of paddle members each of which is secured to the center portion of the outer surface of said hollow tubular member and to an end of at least one of the spiral flight sections.

4. The axial flow combine harvester of claim 3 characterized by the paddle members of the auger beater each having one free end which is not attached to a spiral flight section.

5. The axial flow combine harvester of claim 4 characterized by the auger beater including at least four paddle members.

6. The axial flow combine harvester of claim 1 characterized by the feed means capable of feeding crop material through the crop inlet including a conveyor means forward of the auger beater.

7. The axial flow combine harvester of claim 1 characterized by the feed means including the auger beater being mounted in an elevator housing.

8. The axial flow combine harvester of claim 7 characterized by the elevator housing being pivotally attached to the combine harvester frame.

9. The axial flow combine harvester of claim 8 characterized by hydraulic cylinder means attached to the elevator housing and the combine harvester frame and capable of pivoting the elevator housing about the axis of the auger beater shaft.

10. The axial flow combine harvester of claim 7 characterized by the feed means including a chain and slat conveyor.

* * * * *